(12) United States Patent
Kim et al.

(10) Patent No.: US 9,620,164 B2
(45) Date of Patent: Apr. 11, 2017

(54) HOLOGRAPHIC DATA STORAGE SYSTEM

(71) Applicant: LG ELECTRONICS INC., Seoul (KR)

(72) Inventors: Nakyeong Kim, Seoul (KR); Byounggyo Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/908,472

(22) PCT Filed: Aug. 12, 2014

(86) PCT No.: PCT/KR2014/007493
§ 371 (c)(1),
(2) Date: Jan. 28, 2016

(87) PCT Pub. No.: WO2015/023111
PCT Pub. Date: Feb. 19, 2015

(65) Prior Publication Data
US 2016/0196849 A1    Jul. 7, 2016

Related U.S. Application Data

(60) Provisional application No. 61/866,548, filed on Aug. 16, 2013.

(30) Foreign Application Priority Data
Aug. 12, 2014    (KR) .......................... 10-2014-0104229

(51) Int. Cl.
G11B 7/0065    (2006.01)
G11B 7/1365    (2012.01)
(Continued)

(52) U.S. Cl.
CPC ............ *G11B 7/1365* (2013.01); *G11B 7/135* (2013.01); *G11B 7/1356* (2013.01);
(Continued)

(58) Field of Classification Search
None
See application file for complete search history.

(56) References Cited

U.S. PATENT DOCUMENTS

2004/0027968 A1    2/2004 Horimai
2006/0159001 A1    7/2006 Imanishi
(Continued)

FOREIGN PATENT DOCUMENTS

KR    10-1998-041786 A    8/1998
KR    10-2003-0045824 A    6/2003
(Continued)

Primary Examiner — Brian Butcher
(74) Attorney, Agent, or Firm — Birch, Stewart, Kolasch & Birch, LLP

(57) ABSTRACT

Provided is a holographic data storage system characterized by including: a first polarizing beam splitter (PBS), wherein at least either of a first lens module and a second lens module transmits P-polarized light and reflects S-polarized light; a relay lens collecting light passing through the first PBS; a mirror reflecting the light collected through the relay lens back to the relay lens; and a quarter wave plate located between a second PBS beam splitter and the relay lens, converting transmitted linearly polarized light into circularly polarized light, and converting the circularly polarized light into linearly polarized light. By reducing the volume of the relay lens, it is possible to decrease the size of the holographic data storage system, and by decreasing the number of lenses, it is possible to lower manufacturing costs.

5 Claims, 15 Drawing Sheets

(51) Int. Cl.
    *G11B 7/1372*    (2012.01)
    *G11B 7/135*     (2012.01)
    *G11B 7/1356*    (2012.01)
    *G11B 7/1362*    (2012.01)
    G11B 7/0037      (2006.01)
    G11B 7/00        (2006.01)
    G11B 7/085       (2006.01)
    G11B 7/1378      (2012.01)

(52) U.S. Cl.
    CPC .......... *G11B 7/1362* (2013.01); *G11B 7/1372* (2013.01); *G03H 2210/22* (2013.01); *G03H 2222/31* (2013.01); *G11B 7/0037* (2013.01); *G11B 7/0065* (2013.01); *G11B 7/08564* (2013.01); *G11B 7/1378* (2013.01); *G11B 2007/0009* (2013.01); *G11B 2007/00656* (2013.01); *G11B 2007/13727* (2013.01)

(56) References Cited

U.S. PATENT DOCUMENTS

2008/0239428 A1* 10/2008 Bell .................... G11B 7/00772
                                                    359/30
2009/0129238 A1   5/2009 Shimano et al.
2009/0174920 A1*  7/2009 Jeong ................ G11B 7/00781
                                                    359/31

FOREIGN PATENT DOCUMENTS

KR  10-2006-0083896 A   7/2006
KR  10-2009-0071125 A   7/2009

* cited by examiner

HOLOGRAPHIC DATA STORAGE SYSTEM

CROSS REFERENCE TO RELATED APPLICATIONS

This application is the National Phase of PCT International Application No. PCT/KR2014/007493, filed on Aug. 12, 2014, which claims priority under 35 U.S.C. 119(e) to U.S. Provisional Application No. 61/866,548, filed on Aug. 16, 2013 and under 35 U.S.C. 119(a) to Patent Application No. 10-2014-0104229, filed in the Republic of Korea on Aug. 12, 2014, all of which are hereby expressly incorporated by reference into the present application.

TECHNICAL FIELD

The present invention relates to a holographic data storage system, and more particularly, to a system which is capable of recording holographic data on a holographic data storage medium and reading the holographic data.

BACKGROUND ART

Optical storage technology is widely used in general life, and representative examples thereof include a Compact Disc (CD), Digital Versatile Disc (DVD), Blu-ray, and the like. The quantity of data to be recorded in an optical storage device is increasing thanks to the dissemination of high-quality images, and the development of the optical storage device is being conducted with the goals of increased integration, size reduction, and weight reduction, in order to enable a great quantity of data to be recorded.

In addition, there is a demand for a holographic storage medium, which is advantageous in size reduction and is strongly resistant to external shocks, in order to ensure that the optical storage device is attachable to a mobile appliance so as to increase the utility thereof. This requires a structural change in a conventional disc-shaped optical storage device.

A holographic data storage system using a hologram has been studied for application to optical storage methods in consideration of the recent trend toward high integration and size reduction.

The holographic data storage system is based on the principle of recording and reading data in page units, and therefore has advantages of fundamentally increasing a data transmission rate and theoretically realizing a storage density of 1 Tbit/cm$^2$ through the use of a parallel data processing method that uses, for example, an LCD, CCD (or CMOS) as an input/output device.

In the holographic data storage system, the core principle of enabling high density recording comes from the fact that data can be recorded in an overlapping manner in the same location on a holographic storage medium, without requiring spatial isolation. This method is referred to as a multiplexing technique, and in particular, an angle multiplexing technique has been the most widely used, in which two kinds of light are emitted at different angles so that data is recorded in an overlapping manner.

However, the holographic data storage system has been difficult to commercialize due to the large volume thereof, and thus studies with the goal of minimizing the volume thereof are being conducted.

DISCLOSURE

Technical Problem

An object of the present invention is to provide a holographic storage system having a reduced size.

Technical Solution

There is provided a holographic data storage system including a light source unit configured to supply light vibrating in a given direction, a reference lens configured to direct the light supplied from the light source unit to a holographic storage medium, a combination module including a spatial light modulator (SLM) configured to combine digital information with the light supplied from the light source unit so as to modulate the light into a signal beam, an objective lens configured to record the digital information on the holographic storage medium by directing the modulated signal beam to the holographic storage medium at a prescribed angle with the reference lens, a first lens module configured to transmit light input from the light source unit to the spatial light modulator, and a second lens module configured to transmit the signal beam to the objective lens, wherein at least one of the first lens module or the second lens module includes a first polarizing beam splitter (PBS) configured to pass P-polarized light and reflect S-polarized light, a relay lens configured to collect the light having passed through the first polarizing beam splitter, a mirror configured to reflect the light collected while passing through the relay lens so as to return the light back to the relay lens, and a quarter wave plate located between the second polarizing beam splitter and the relay lens and configured to convert linearly polarized light passing therethrough into circularly polarized light and to convert circularly polarized light passing therethrough into linearly polarized light.

The mirror may be located at a focal distance of the relay lens.

The mirror may have a diameter within a range from 100 μm to 100 mm.

The combination module may further include a second polarizing beam splitter located in front of the spatial light modulator and configured to pass P-polarized light and reflect S-polarized light, the spatial light modulator may convert input P-polarized light into S-polarized light so as to emit the S-polarized light, or may convert input S-polarized light into P-polarized light so as to emit the P-polarized light, and the first lens module and the second lens module may be oriented perpendicular to the polarizing beam splitter.

The spatial light modulator may be located opposite to the first lens module about the second polarizing beam splitter when P-polarized light is supplied from the first lens module, and the spatial light modulator may be oriented perpendicular to the first lens module about the second polarizing beam splitter when S-polarized light is supplied from the first lens module.

The holographic data storage system may further include a complementary metal oxide semiconductor (CMOS) image sensor oriented perpendicular to the spatial light modulator and configured to convert input light into an electrical signal so as to amplify the same, and a reconstructed beam, which is generated by emitting light from the reference lens to the holographic storage medium, may be input to the CMOS image sensor through the objective lens, the second lens module, and the second polarizing beam splitter.

The holographic data storage system may further include a half wave plate located between the second polarizing beam splitter and the second lens module and configured to shift a phase of input light by λ/2.

The half wave plate may be selectively located between the second polarizing beam splitter and the second lens module when the signal beam is emitted from the objective lens or when the reconstructed beam is input to the objective lens.

Advantageous Effects

According to at least one embodiment of the present invention, it is possible to reduce the size of a holographic data storage system by reducing the volume of a relay lens, and it is possible to lower manufacturing costs by reducing the number of lenses.

The additional range of application of the present invention will become clear from the following detailed description. However, since various modifications and alterations will be clearly understood by those skilled in the art within the scope and sprit of the present invention, the detailed description and specific embodiments such as the exemplary embodiments of the present invention should be understood as being merely provided by way of example.

BEST MODE

Hereinafter, a holographic data storage system in accordance with the present invention will be described in detail with reference to the accompanying drawings.

Holographic data storage technology is technology that is capable of recording digital information on a holographic storage medium in page units in a multi-recording manner. This enables the storage of 250 times more data than on a DVD, and also enables the storage and reading of data in page units, which may result in a groundbreaking improvement in recording and reading speeds.

In holographic data storage technology, a signal beam, which includes digital information, and a reference beam, which serves as a reference, are emitted to a holographic storage medium, so that the interference pattern formed by the two kinds of light is recorded on the holographic storage medium.

The two kinds of light are emitted to the holographic storage medium so as to have a prescribed angle therebetween, and a plurality of pieces of data may be stored at the same position in the holographic storage medium based on the angle between the emitted two kinds of light. That is, assuming that the angle at which the reference beam and the signal beam are emitted to the holographic storage medium is changed n times, n pieces of digital information are stored in the holographic storage medium. In this way, many pieces of data may be intensively stored in a small space.

When the reference beam is emitted to the holographic storage medium on which digital information is recorded, a reconstructed beam, which includes the digital information, may be obtained. When the reconstructed beam is emitted to a complementary metal oxide semiconductor (CMOS) image sensor, a recorded image may be read.

The holographic data storage system of the present invention has a feature whereby the size thereof is reduced compared to a conventional system thanks to an improvement in a system capable of recording and reading digital information on the holographic storage medium.

Figure 1:
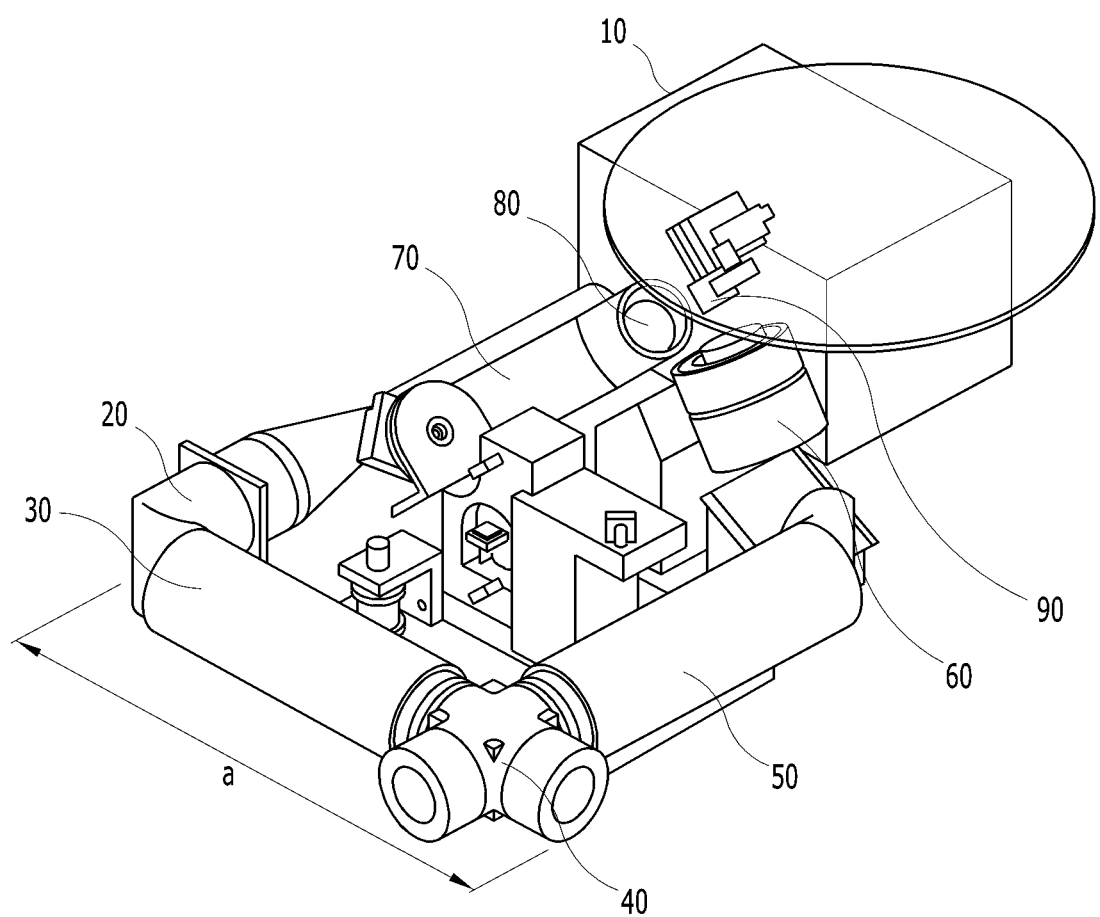
FIG. 1 is a perspective view illustrating a conventional holographic data storage system.
Figure 2:
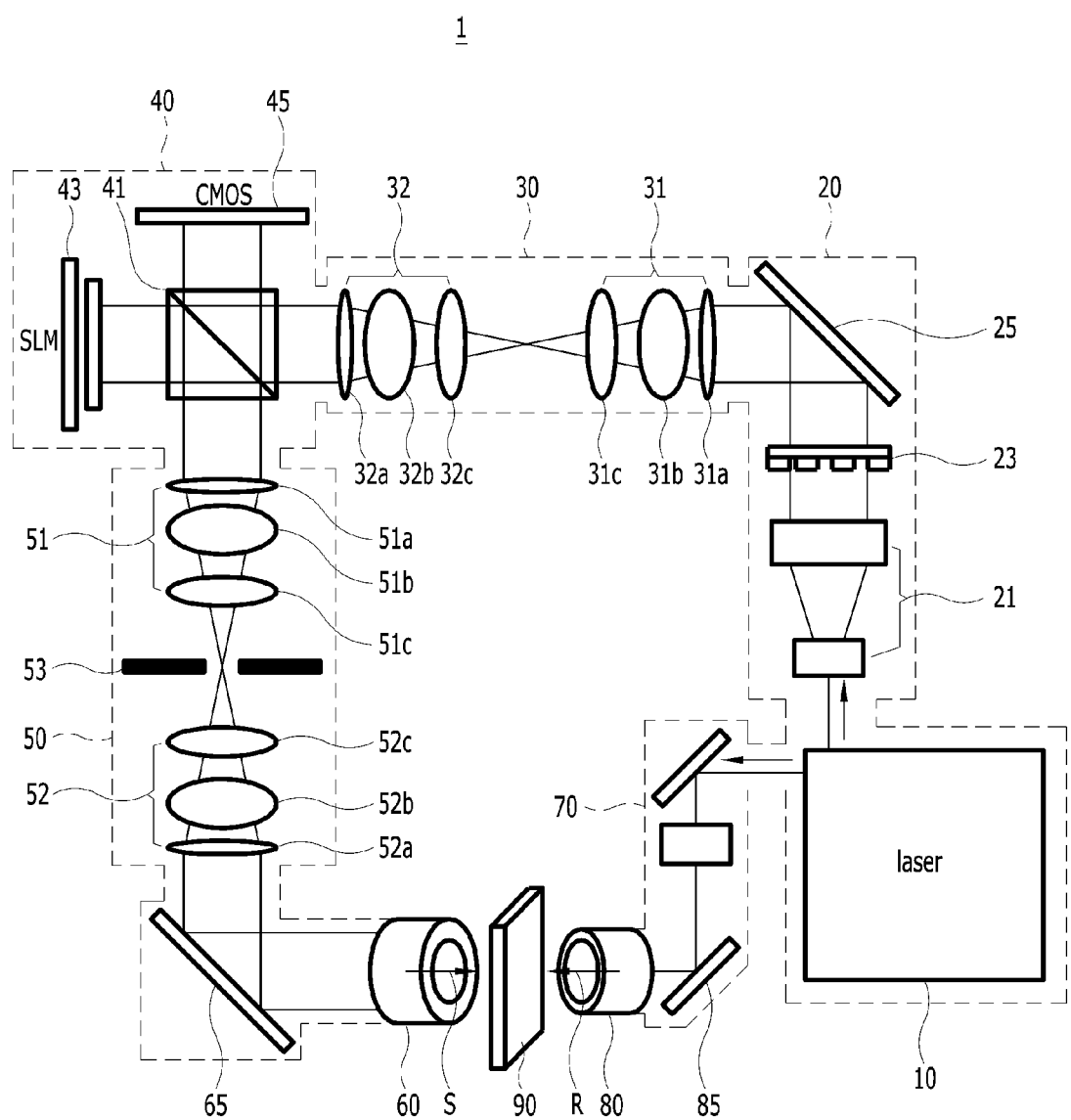
FIG. 2 is a conceptual view for the explanation of the conventional holographic data storage system.

Prior to considering the holographic data storage system 100 of the present invention, a conventional holographic data storage system 1 will be described first. FIG. 1 is a perspective view illustrating the conventional holographic data storage system 1, and FIG. 2 is a conceptual view illustrating the conventional holographic data storage system 1.

The holographic data storage system 1 is comprised of a light source unit 10, which supplies light, reference modules 70 and 80, which emit the light supplied from the light source unit 10 to a holographic storage medium 90, and signal modules 20, 30, 40, 50 and 60, which combine digital information with the light supplied from the light source unit 10 and emit the light to the holographic storage medium 90.

The light that is emitted from the reference modules 70 and 80 to the holographic storage medium 90 is referred to as a reference beam R, and the light that includes the digital information emitted from the signal modules 20, 30, 40, 50 and 60 is referred to as a signal beam S. The light supplied from the light source unit 10 may be used as the reference beam R without conversion, and thus the reference modules 70 and 80 have a simplified configuration. However, because the signal beam S needs to combine the digital information with the light supplied from the light source unit 10, the signal modules 20, 30, 40, 50 and 60 include an expansion module 20, a first lens module 30, a combination module 40, a second lens module 50, and an objective lens 60.

The expansion module 20 includes a beam expander 21 and a phase mask 23. The light supplied from the light source unit 10 is a point light source that is emitted to a small point, and is expanded to become a surface light source by the beam expander 21. The light, converted into the surface light source, is processed and output so as to be suitable for combining with the digital information via the phase mask 23.

The combination module 40 includes a spatial light modulator (SLM) 43, which combines digital information with the light supplied from the light source unit 10. The spatial light modulator 43 converts input light into the signal beam S, which includes an image having bright points and dark points, based on an electrical signal including digital information. The signal beam S, output from the spatial light modulator 43, is emitted to the holographic storage medium 90 such that the signal beam S from the combination module 40 has an angle in relation to the reference beam R, whereby an interference pattern, which is created when the signal beam S and the reference beam R intersect each other, is recorded on the holographic storage medium 90.

However, because light tends to diffuse, the path of light has high light intensity in the central region and low light intensity in peripheral regions. In order to supply a surface light source having an even intensity of light throughout the overall area thereof, a plurality of lenses may be arranged so as to supply an even intensity of light to the spatial light modulator 43. In addition, in order to record the combined vivid digital information on the holographic storage medium 90, the signal beam S, which includes the digital information, may also be processed so as to be evenly supplied.

The lens modules 30 and 50, each of which includes a plurality of lenses that is arranged to overlap each other, may include the first lens module 30 provided at the input side of the combination module 40 and the second lens module 50 provided at the output side. The first lens module 30, which is provided at the input side of the combination module 40, processes the light to be supplied to the combination module 40, which combines images, and the second lens module 50, which is provided at the output side of the combination module 40, processes the signal beam S, which is combined and emitted from the combination module 40.

The lens modules 30 and 50 are constructed by overlapping a plurality of lenses 31a, 31b, 31c, 32a, 32b, 32c, 51a, 51b, 51c, 52a, 52b and 52c with one another. The lens module includes a front relay lens 31, which collects light, and a rear relay lens 32, which diffuses the collected light. When the area of the input light and the area of the output light are the same, the front relay lens 31 and the rear relay lens 32 may be formed symmetrical to each other.

However, because each of the front relay lens 31 and the rear relay lens 32 includes a plurality of lenses and the lenses are spaced apart from one another in consideration of a focal length, the lens modules 30 and 50 may problematically have an increased length.

Therefore, in order to solve the problem described above, the present invention may be devised to reduce the size of a holographic data storage system by reducing the number of lenses included in a first lens module or a second lens module.

Figure 3:
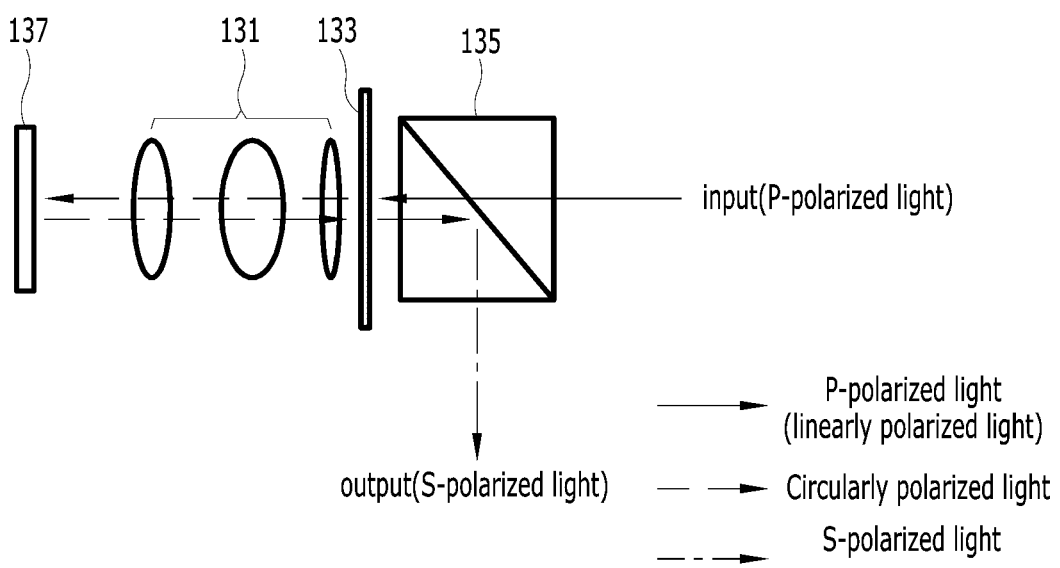
FIG. 3 is a view illustrating the path of light when P-polarized light is input to a first lens module in a holographic data storage system in accordance with one embodiment of the present invention.

FIG. 3 is a view illustrating a first lens module 130 in a holographic data storage system in accordance with one embodiment of the present invention. The first module of the present invention is comprised of a first polarizing beam splitter (PBS) 135, a quarter wave ($\lambda/4$) plate 133, a relay lens 131, and a first mirror 137. Although the first lens module 130 will be described below, the following description may also be applied to a second lens module 150.

The first polarizing beam splitter 135 is an anisotropic member that selectively passes or reflects light by passing P-polarized light and reflecting S-polarized light. Light vibrates in the direction perpendicular to the traveling direction thereof, and travels while forming vibrating planes having various angles therebetween. The light, which vibrates in various directions, may be divided into an S-polarized light component, which vibrates in the vertical direction, and a P-polarized light component, which vibrates in the horizontal direction.

When light supplied from a light source unit 110 is P-polarized light, the light passes through the first polarizing beam splitter 135 and is supplied to the relay lens 131. Unlike the conventional first lens module 30 described above, which includes the front relay lens 31 and the rear relay lens 32, the first lens module 130 of the present embodiment includes only one relay lens 131. Instead of this, as light passes through the single relay lens 131 two times, the same effects as the conventional relay lenses 131 may be acquired.

The first mirror 137 is used to cause light to pass through the single relay lens 131 two times. The light having passed through the relay lens 131 is collected and reaches the first mirror 137. The first mirror 137 reflects the light back to the relay lens 131 so that the reflected light again passes through the relay lens 131.

After the light, reflected by the first mirror 137, passes through the relay lens 131, the light is again supplied to the first polarizing beam splitter 135. At this time, when the light, which has been reflected by the first mirror 137 and has returned back to the first polarizing back splitter 135, is P-polarized light, like the light input from the light source unit 110, there is a problem in that the light reflected by the first mirror 137 passes through the first polarizing beam splitter 135 so as to return in the light input direction from the light source unit.

Therefore, in order to convert the light, which has passed through the relay lens 131 two times and has been supplied back to the first polarizing beam splitter 135, into light that is oriented perpendicular to the input light, the quarter wave plate 133 may be interposed between the first polarizing beam splitter 135 and the relay lens 131.

The quarter wave plate 133 is a double refraction plate that generates a phase shift of $\lambda/4$ in linearly polarized light. When linearly polarized light passes through the quarter wave plate 133, it is converted into circularly polarized light. When linearly polarized light passes through the quarter wave plate 133 two times, a phase shift of $\lambda/2$ is generated, whereby P-polarized light is converted into S-polarized light or S-polarized light is converted into P-polarized light.

That is, light undergoes a phase shift of $\lambda/4$ when passing through the quarter wave plate 133 prior to passing through the relay lens 131. Then, the light, which has been reflected by the first mirror 137 and has again passed through the relay lens 131, undergoes a phase shift of $\lambda/2$ compared to the light initially input to the first lens module 130 while passing through the quarter wave plate 133. That is, the P-polarized light, input from the light source unit 110, is converted into S-polarized light by passing through the quarter wave plate 133 two times, thereby being input to the first polarizing beam splitter 135 and being bent at an angle of 90 degrees so as to be output to a combination unit 140.

Figure 4:
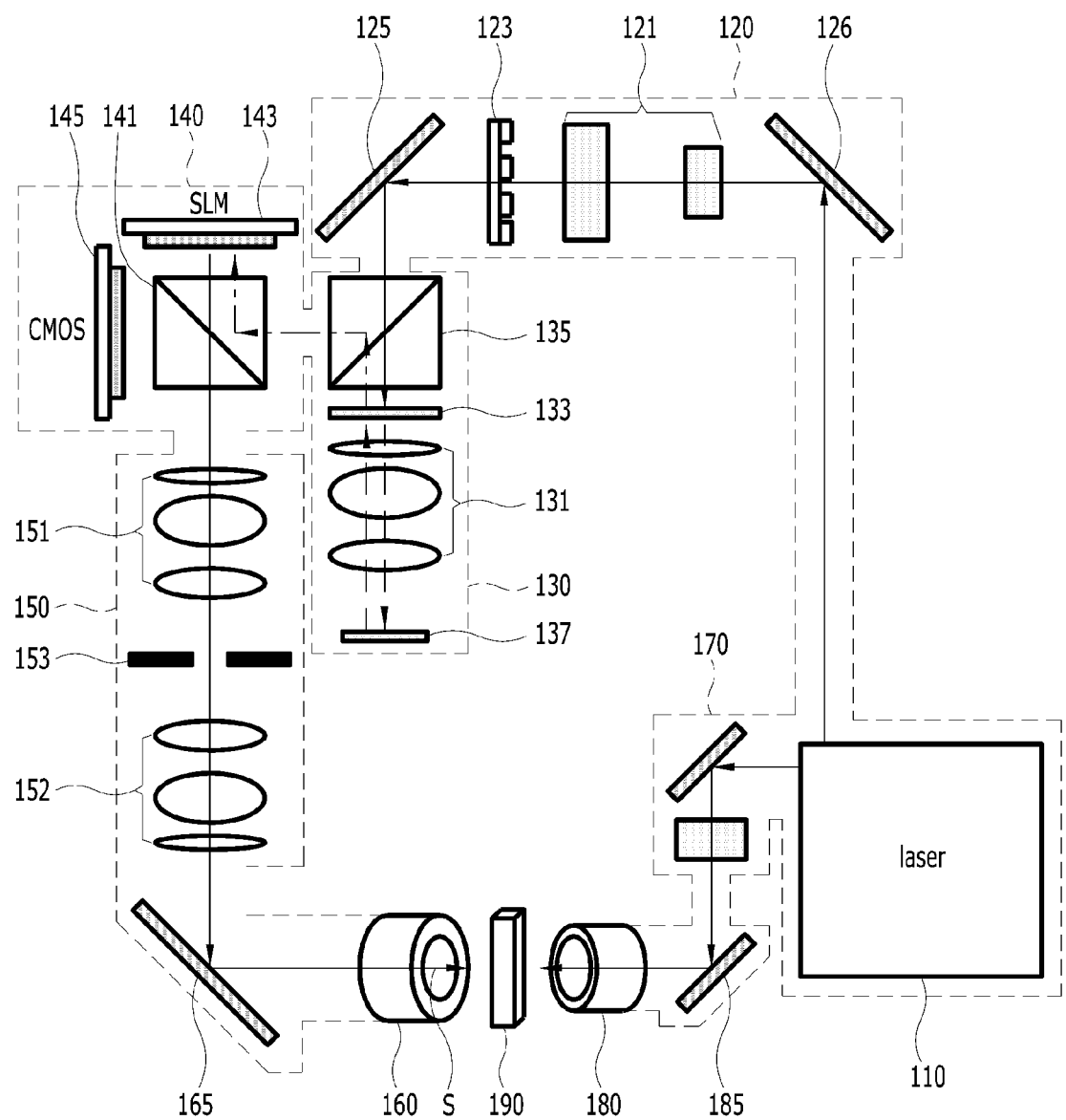
FIG. 4 is a view illustrating a holographic data storage system in accordance with one embodiment of the present invention.

FIG. 4 is a view illustrating a holographic data storage system 100 using the first lens module 130 of FIG. 3. As the size of the first relay lens 131 is reduced, the size of the entire holographic data storage system 100 may be reduced.

Figure 5:
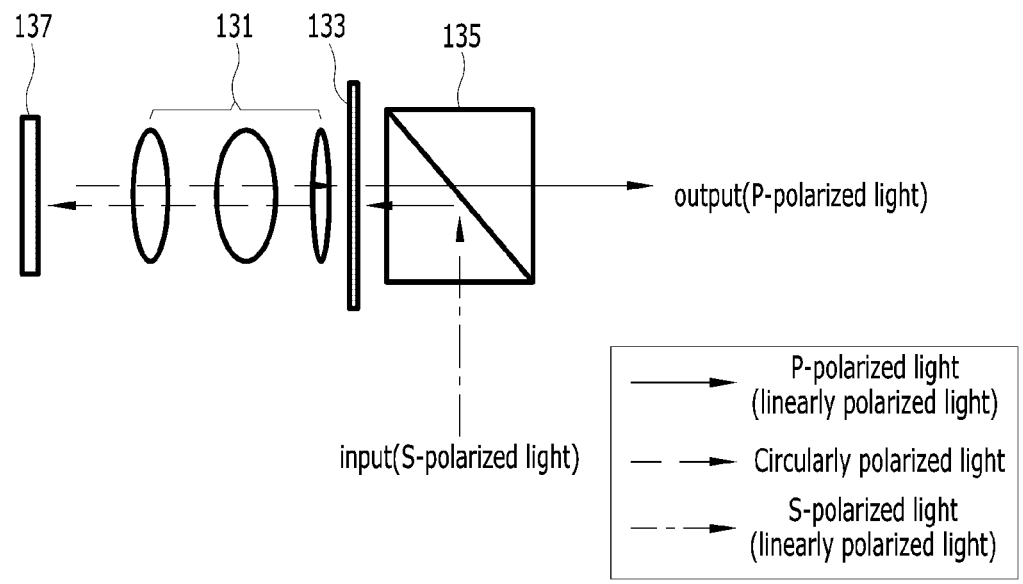
FIG. 5 is a view illustrating the path of light when S-polarized light is input to a first lens module in a holographic data storage system in accordance with another embodiment of the present invention.

FIG. 5 is a view illustrating the passage of light through the first lens module 130 when S-polarized light is supplied from the light source unit 110. The quarter wave plate 133, the first relay lens 131, and the first mirror 137 are oriented perpendicular to the direction in which the light from the light source unit 110 is input to the first polarizing beam splitter 135.

The first polarizing beam splitter 135 reflects S-polarized light at an angle of 90 degrees. Then, the light, which has passed through the quarter wave plate 133 and the relay lens 131, is reflected by the first mirror 137 so as to again pass through the relay lens 131 and the quarter wave plate 133, thereby being input to the first polarizing beam splitter 135.

Figure 6:
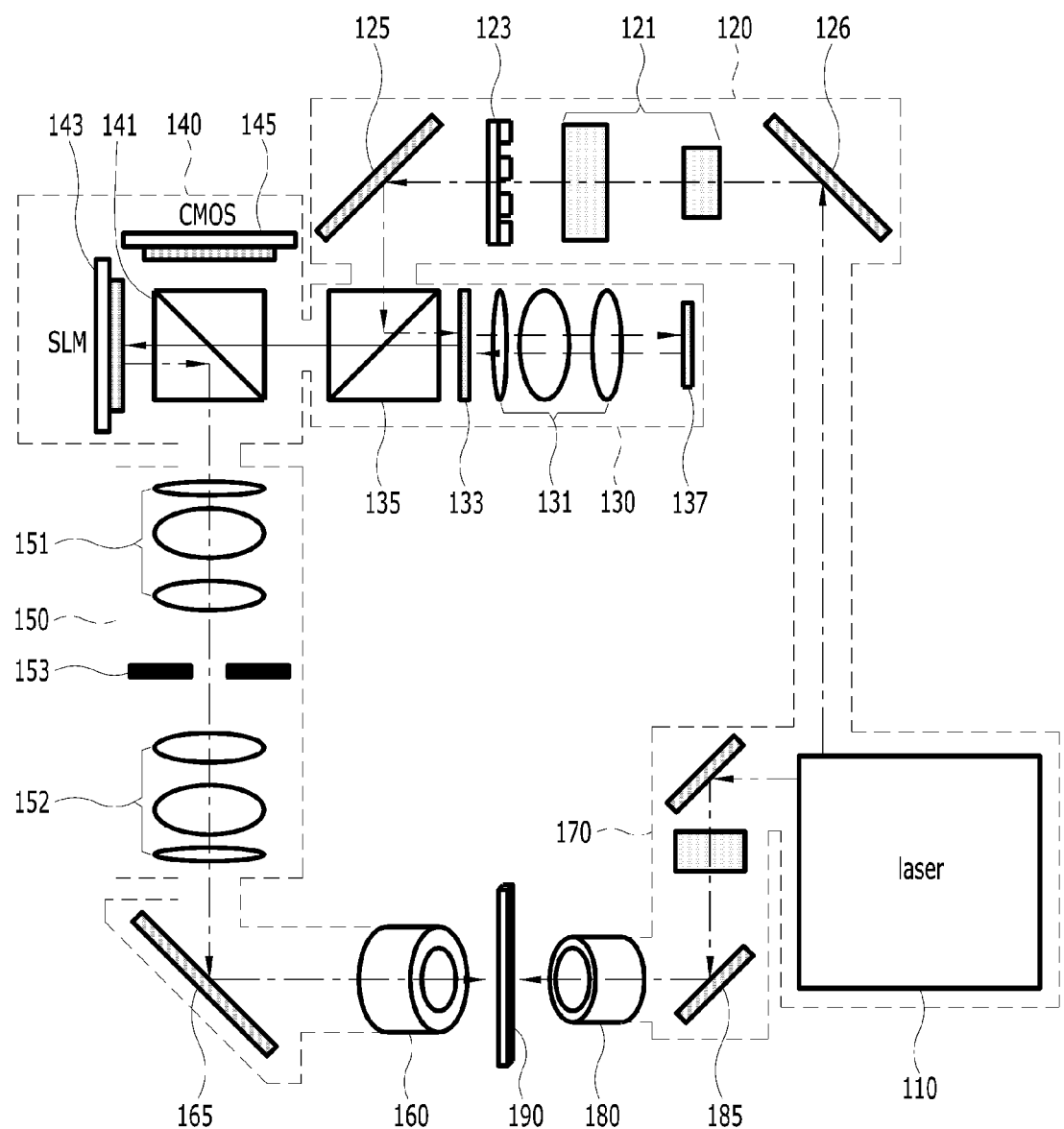
FIG. 6 is a view illustrating the holographic data storage system in accordance with another embodiment of the present invention.

The input S-polarized light is converted into P-polarized light by passing through the quarter wave plate 133 two times. The P-polarized light is again input to the first polarizing beam splitter 135 and directly passes therethrough so as to be output, rather than being reflected by the first polarizing beam splitter. FIG. 6 is a view illustrating the holographic data storage system 100 using the first lens module 130 of FIG. 5. In FIG. 6, the orientation of the first lens module 130 is different from that in FIG. 4.

The orientation of the first lens module 130 may be changed according to the polarized light supplied from the light source unit 110. Alternatively, when a half wave plate, which converts S-polarized light into P-polarized light or converts. P-polarized light into S-polarized light, is interposed between the first lens module 130 and an expansion module 120, the light may be transmitted to the combination module 150 without changing the orientation of the first lens module 130.

Figure 7:
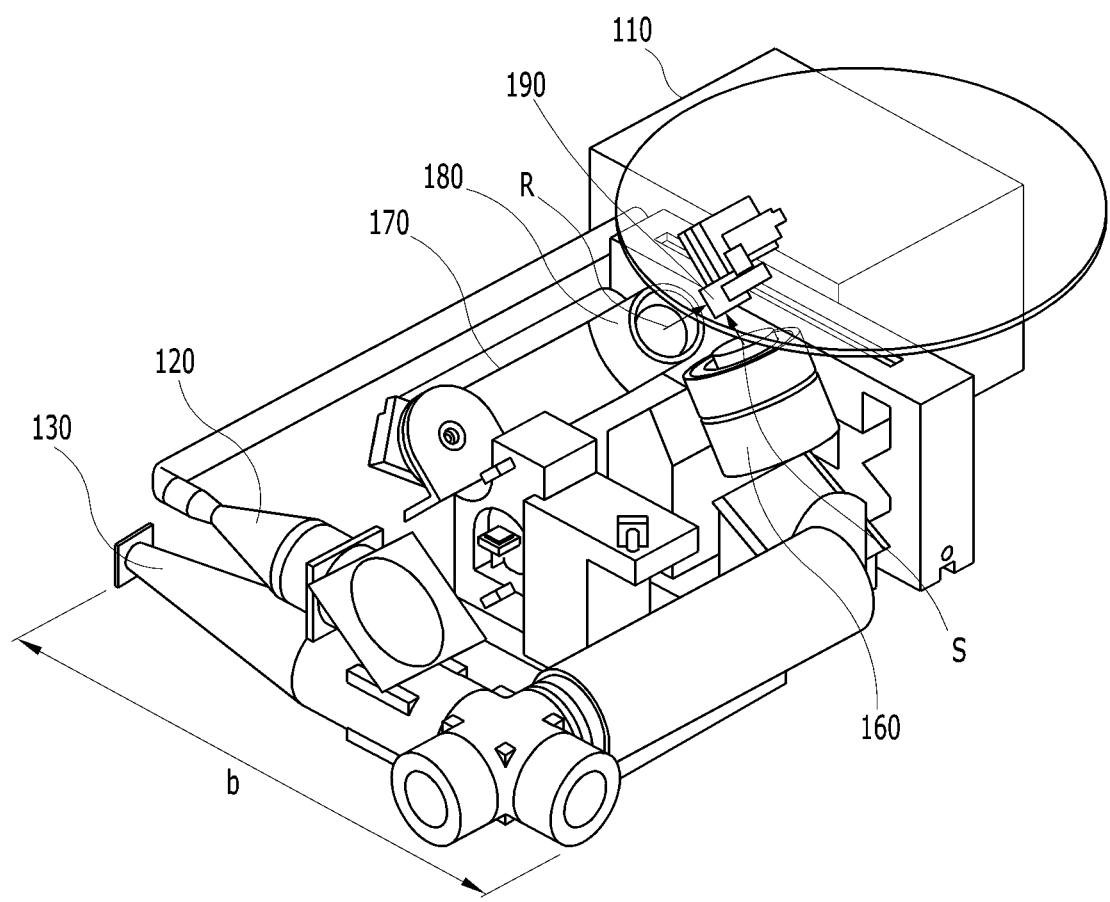
FIG. 7 is a perspective view of the holographic data storage system of FIG. 6.

FIG. 7 is a perspective view of the holographic data storage system 100 of FIG. 6. The horizontal length of the entire holographic data storage system may be reduced compared to the conventional holographic data storage system 1 illustrated in FIG. 1 (a>b).

Light output from the first lens module 130 to the combination module 140 is combined with digital information and is output as a signal beam S. The combination module 140 includes a spatial light modulator 143 described above, and the signal beam, combined with the digital information in the spatial light modulator 143, is again output in the input direction thereof. In order to distinguish the input direction and the output direction of the light to or from the combination module 140, the combination module 140 may include a second polarizing beam splitter 141.

The combined signal beam is output from the spatial light modulator 143 in such a state in which it has been polarized light is input, the signal beam is output as 5-polarized light, whereas, when S-polarized light is input, the signal beam is output as P-polarized light.

In the case of FIG. 4, because S-polarized light is input to the combination module 140, the second polarizing beam splitter 141 bends the light at an angle of 90 degrees and supplies the light to the spatial light modulator 143. In this case, the spatial light modulator 143 is oriented perpendicular to the direction in which the light is input from the first lens module 130.

Because the signal beam, combined in the spatial light modulator 143, is modulated into P-polarized light, the second polarizing beam splitter 141 directly passes the P-polarized light so as to output the P-polarized light to the second lens module 150. The spatial light modulator 143, the second polarizing beam splitter 141, and the second lens module 150 are arranged parallel to one another.

Because the P-polarized light, output from the first lens module 130, is input to the combination module 140 in the case of FIG. 6, the second polarizing beam splitter 141 passes the signal beam of P-polarized light and supplies the signal beam to the spatial light modulator 143. In the present embodiment, the spatial light modulator 143 is oriented in a straight line in the direction in which the light is input from the first lens module 130.

Because the signal beam, combined in the spatial light modulator 143, is modulated into S-polarized light, the second polarizing beam splitter 141 reflects the signal beam of S-polarized light so as to output the signal beam to the second lens module 150. In the present embodiment, the spatial light modulator 143, the second polarizing beam splitter 141, and the second lens module 150 are arranged parallel to one another.

The second lens module 150 may further include an aperture 153. The signal beam, which is combined with the digital information in the combination module 140, contains noise. The aperture 153 may be additionally provided in order to remove the noise. Because the noise is not accurately gathered at the focal point after passing through a front relay lens 151, the noise may be removed by blocking the light that is not accurately gathered at the focal point. The diameter of the aperture 153 may be changed according to the size of the entire system, and may be within a range from 100 μm to 100 mm.

The signal beam, having passed through the second lens module 150, is directed to a holographic storage medium 190 by way of an objective lens 160. The angle at which the signal beam is directed to the holographic storage medium 190 may be adjusted by adjusting the angle of a mirror 165, which reflects the light output from the second lens module 150.

In the case of a reference lens 180 that emits a reference beam, the angle of the reference beam may be adjusted by adjusting the angle of a mirror 185, which reflects the light input from the light source unit 110.

Figure 8:
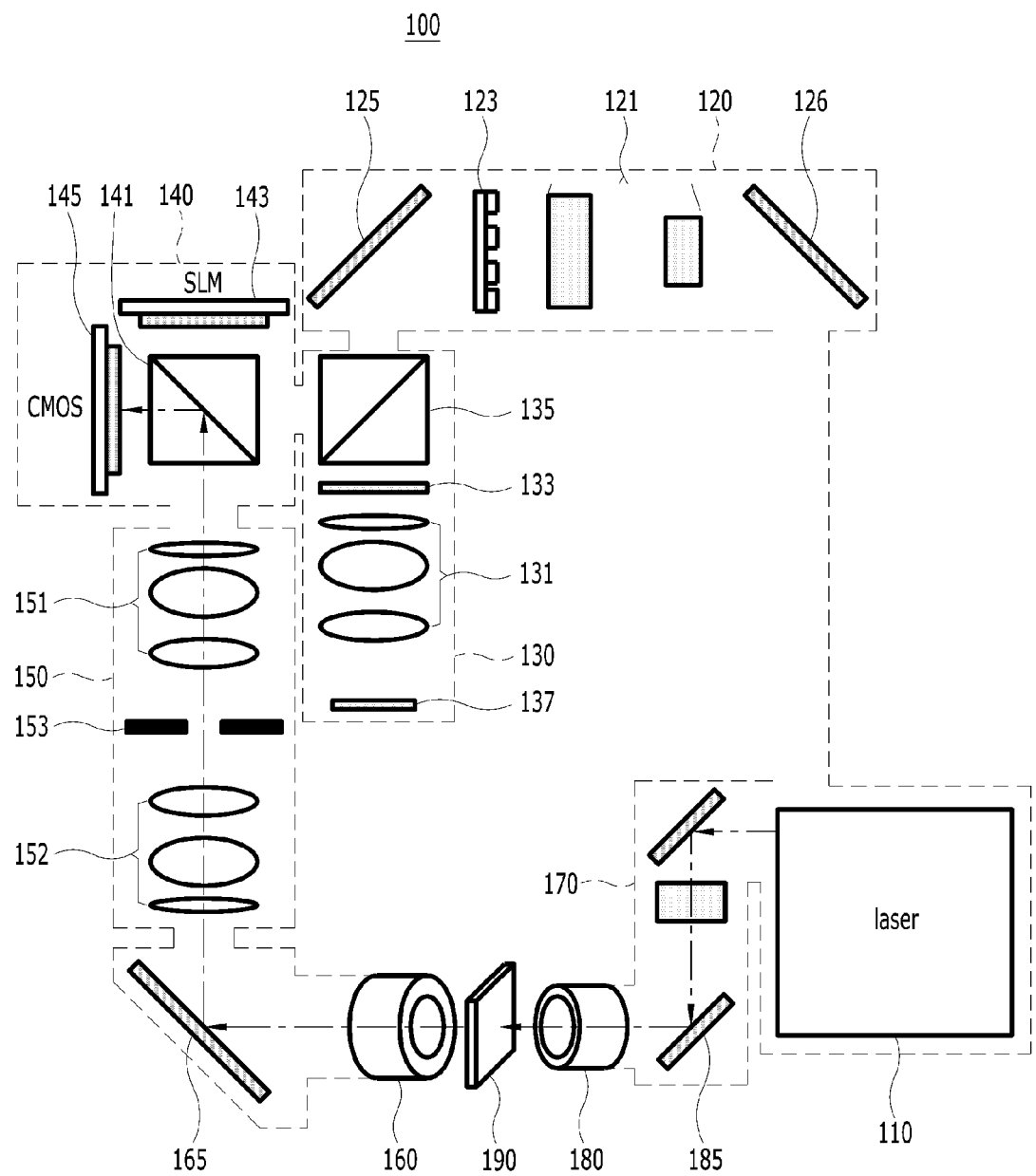
FIG. 8 is a view illustrating the process of extracting and reading digital information recorded on a holographic storage medium using the holographic data storage system of FIG. 4.
Figure 9:
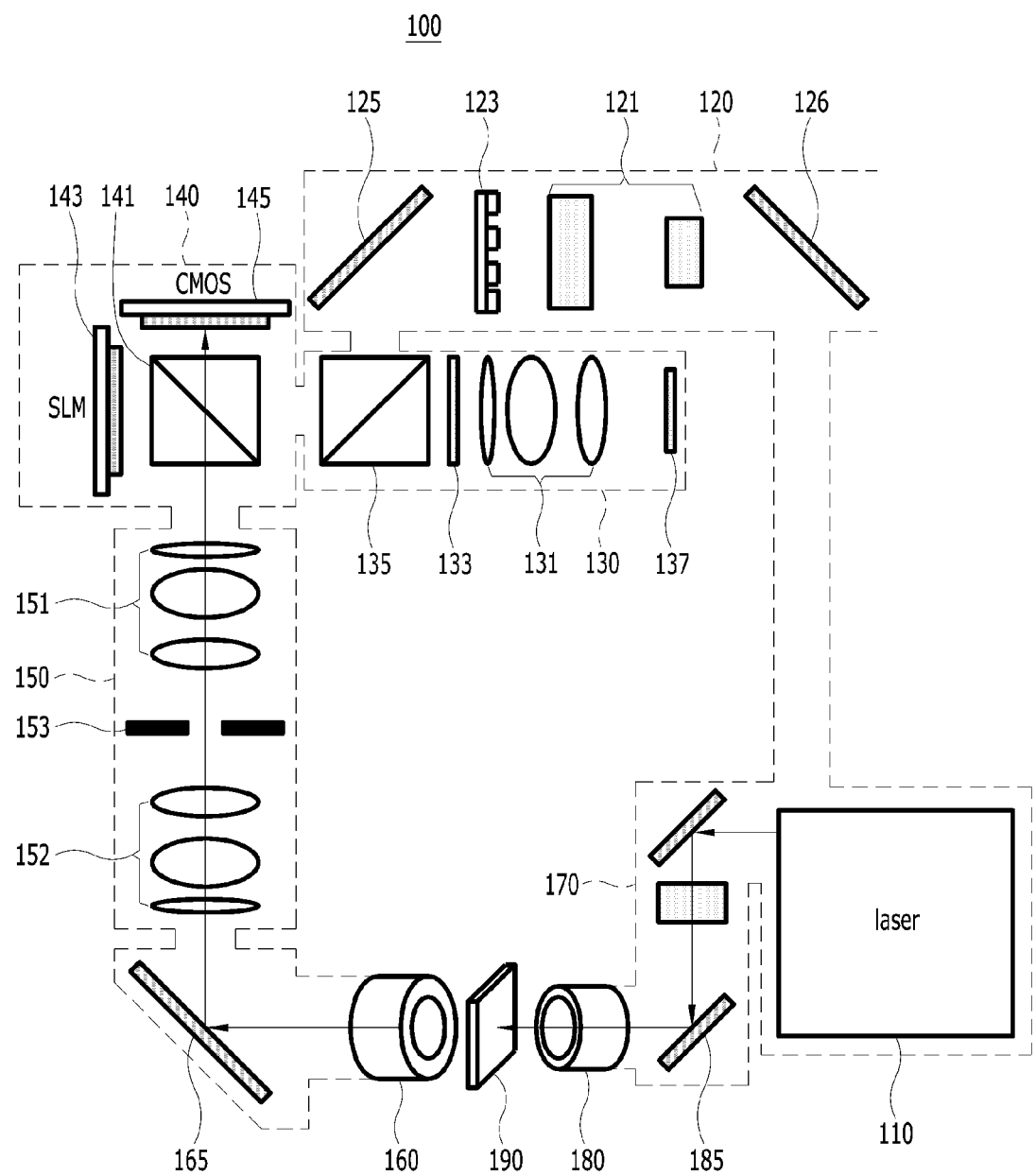
FIG. 9 is a view illustrating the process of extracting and reading digital information recorded on a holographic storage medium using the holographic data storage system of FIG. 6.

FIG. 8 is a view illustrating the process of extracting and reading digital information recorded on the holographic storage medium 190 using the holographic data storage system 100 of FIG. 4, and FIG. 9 is a view illustrating the process of extracting and reading digital information recorded on the holographic storage medium 190 using the holographic data storage system 100 of FIG. 6.

When the reference beam is directed from the reference lens 180 to the holographic storage medium 190, the digital information recorded on the holographic storage medium 190 is extracted, such that a reconstructed beam is input through the objective lens 160. The reconstructed beam passes through the second lens module 150 and is supplied to the combination module 140. The reconstructed beam is input to a complementary metal oxide semiconductor (CMOS) image sensor 145 included in the combination module 140 and is converted into an electrical signal so that an image may be output.

Because the spatial light modulator 143 and the image sensor 145 are oriented perpendicular to each other on the basis of the second polarizing beam splitter 141, when the signal beam, output from the spatial light modulator 143, travels straight after passing through the second polarizing beam splitter 141, the reconstructed beam needs to be reflected by the second polarizing beam splitter 141 so that the traveling direction thereof is changed. When the signal beam is reflected by the second polarizing beam splitter 141, the reconstructed beam needs to pass through the second polarizing beam splitter 141. Therefore, the polarization of light to be directed to the holographic storage medium 190 may be adjusted so that the reconstructed beam, input to the second polarizing beam splitter 141, has a phase shift of $\lambda/2$ in relation to the signal beam.

In the embodiment of FIG. 8 (or in the embodiment of FIG. 4), the reconstructed beam is S-polarized light because the image sensor is oriented perpendicular to the direction in which the reconstructed beam is input from the second lens module 150. In the embodiment of FIG. 9 (or in the embodiment of FIG. 6), the reconstructed beam is P-polarized light because the image sensor is located in a straight line in the direction in which the reconstructed beam is input from the second lens module 150.

Polarized light of the reconstructed beam is determined according to polarized light of the reference beam. Thus, the polarized light of the reconstructed beam may be determined based on the reference beam of S-polarized light that is directed to the holographic storage medium 190 in the embodiment of FIG. 4 and based on the reference beam of P-polarized light that is directed to the holographic storage medium 190 in the embodiment of FIG. 6.

In order to further reduce the size of the holographic data storage system, the second lens module may also include a single relay lens, like the first lens module.

Figure 10:
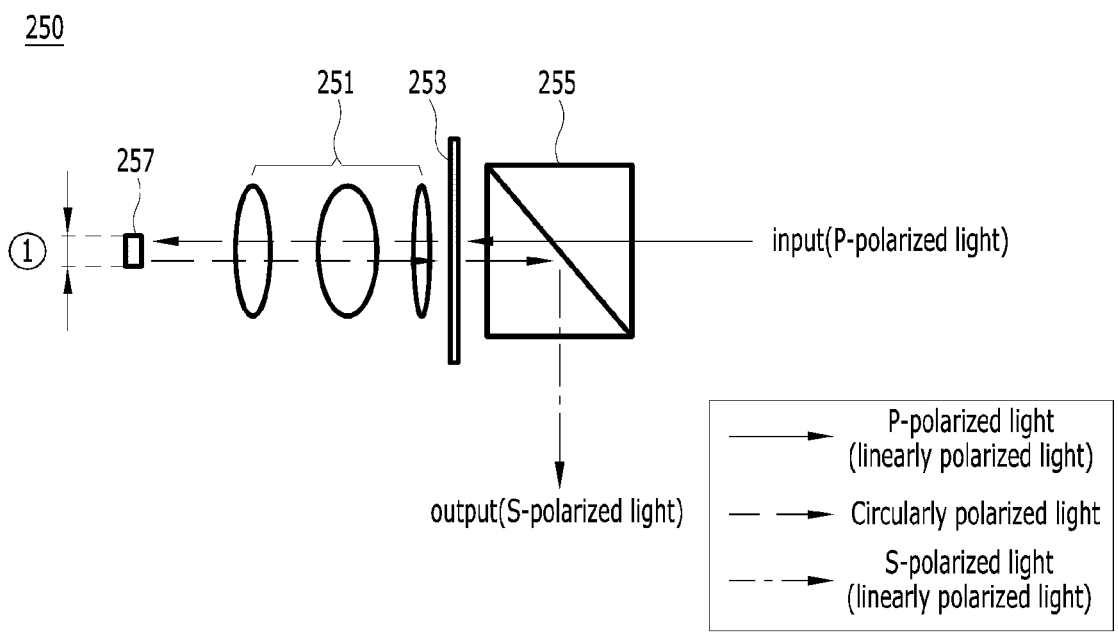
FIG. 10 is a view illustrating a second lens module in a holographic data storage system in accordance with a further embodiment of the present invention.

FIG. 10 is a view illustrating a second lens module 250 in a holographic data storage system in accordance with a further embodiment of the present invention. In the present embodiment, the second lens module 250 includes a third polarizing beam splitter 255, a quarter wave plate 253, a relay lens 251, and a second mirror 257, and the size of the second lens module 250 is reduced by causing light to pass through the single relay lens 251 two times.

Because the second lens module 250 needs to remove noise generated during the combination of digital information, unlike a first lens module 230, the second lens module 250 requires a component that serves as the aperture 153 of the above-described embodiment. In the present embodiment, instead of using the aperture 153, the second lens module 250 may include the second mirror 257 having a reduced size, which may remove noise, which is not accurately converged on the focal point after passing through the relay lens 251, thereby enhancing the resolution of an image.

The size of the second mirror 257 may correspond to the size of the aperture 153 described above. Thus, the diameter of the second mirror 257 may be within a range from 100 μm to 100 mm.

Figure 11:
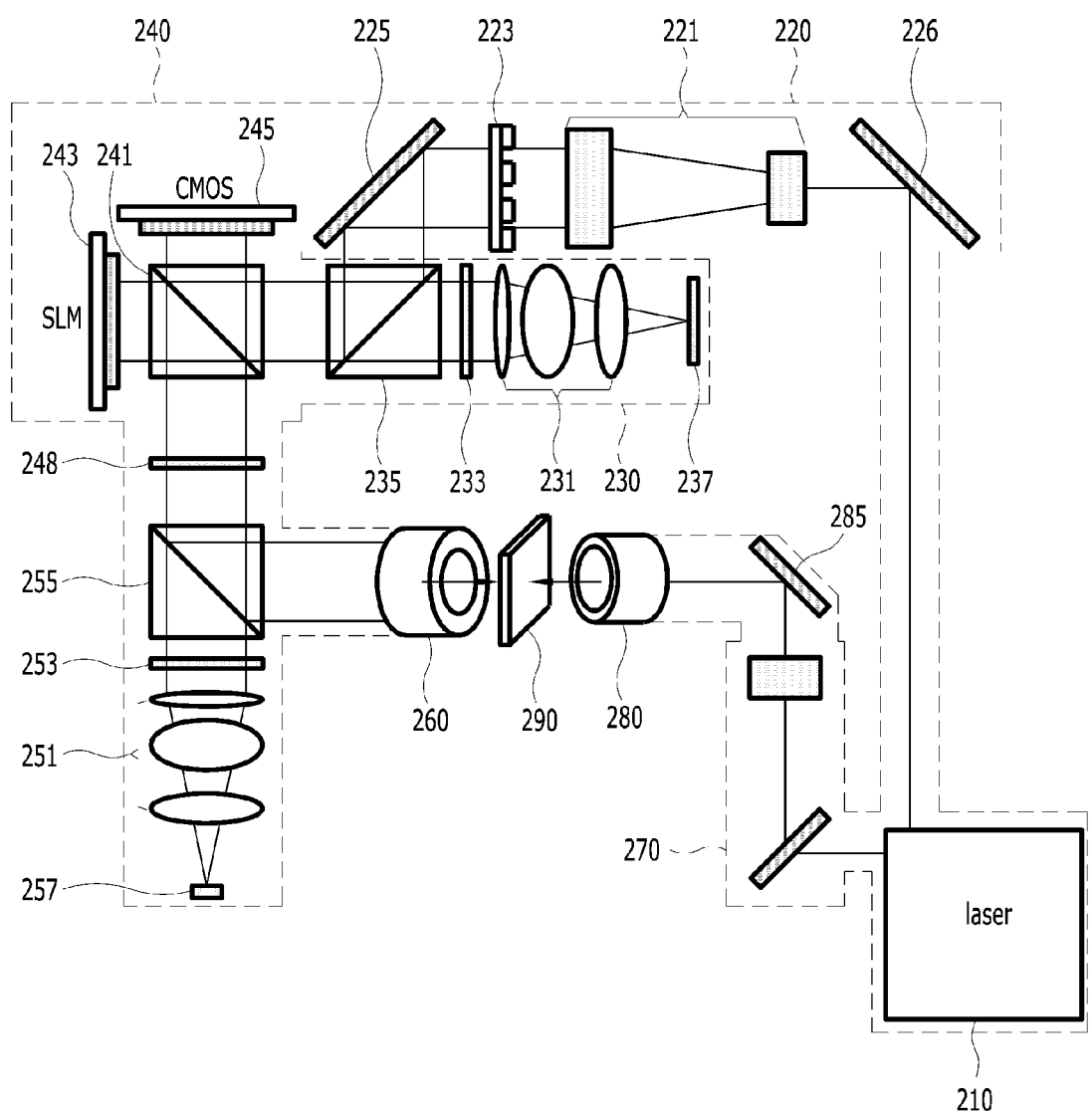
FIG. 11 is a view illustrating the holographic data storage system in accordance with a further embodiment of the present invention.

FIG. 11 is a view illustrating the holographic data storage system in accordance with a further embodiment of the present invention. The holographic data storage system 200 of the present embodiment includes the second lens module 250, which includes the single relay lens 251, the second mirror 257, and the third polarizing beam splitter 255 of FIG. 10, unlike the embodiment of FIG. 6. The second lens module has a reduced size, which results in a reduction in the size of the entire system.

Unlike the first lens module 230 through which a reconstructed beam input from an objective lens 260 does not pass, the reconstructed beam input from the objective lens 260 passes through the second lens module 250. Therefore, it is necessary to construct the system in consideration of the path of the reconstructed beam.

Figure 12:
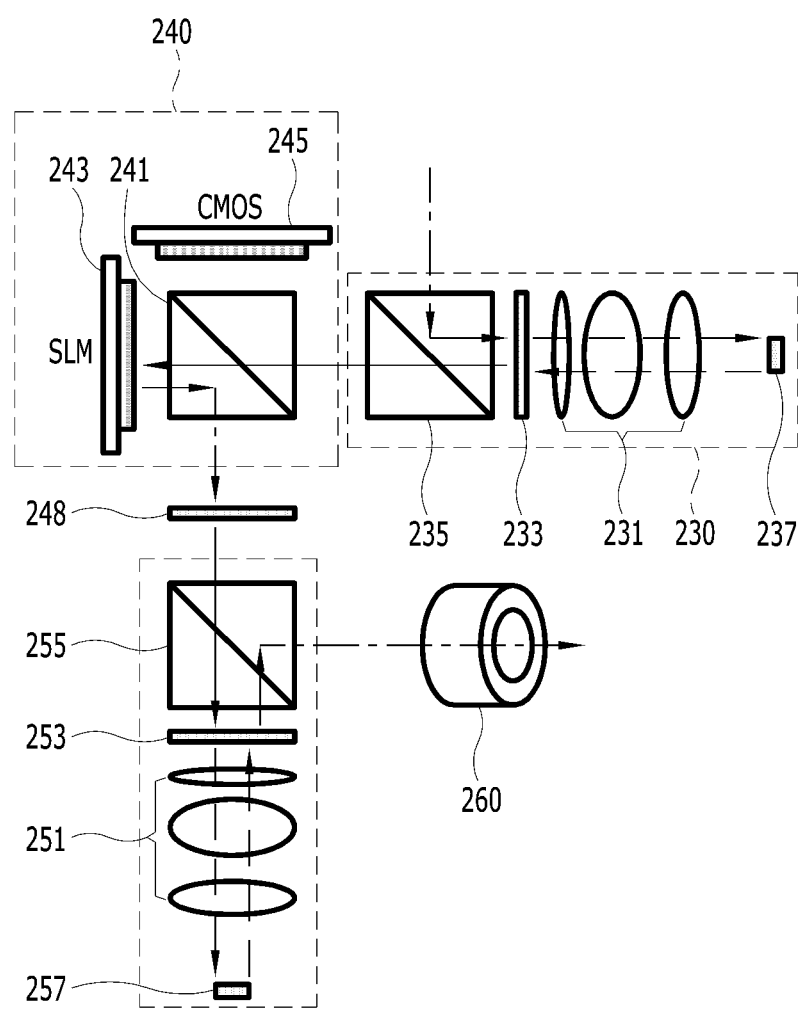
FIGS. 12 and 13 are views illustrating the process of recording and reading data on a holographic storage medium in a holographic data storage system in accordance with a further embodiment of the present invention.

Referring to FIGS. 11 and 12, light in which a signal beam and a reconstructed beam have a phase shift of $\lambda/2$ therebetween is input because an image sensor 245 and a spatial light modulator 243 are oriented perpendicular to the second polarizing beam splitter 241. That is, the reconstructed beam must be S-polarized light when the signal beam is P-polarized light, or the reconstructed beam must be P-polarized light when the signal beam is S-polarized light, so that one of the signal beam and the reconstructed beam is passed and the other one is reflected.

Meanwhile, in the embodiment of FIG. 11, the reconstructed beam to be input to the image sensor 245 passes through the two polarizing beam splitters 241 and 255. Although, the reconstructed beam and the signal beam move along the same path in the third polarizing beam splitter 255 of the second lens module 250, the reconstructed beam and the signal beam need to move along different paths in the second polarizing beam splitter 241.

In the case where the signal beam and the reconstructed beam have a phase shift therebetween, there is a problem in that the optical paths thereof are opposite in the third polarizing beam splitter 255 as well as in the second polarizing beam splitter 241. In the present embodiment, a half wave plate 248 is selectively interposed between the second lens module 250 and the second polarizing beam splitter 241.

Figure 13:
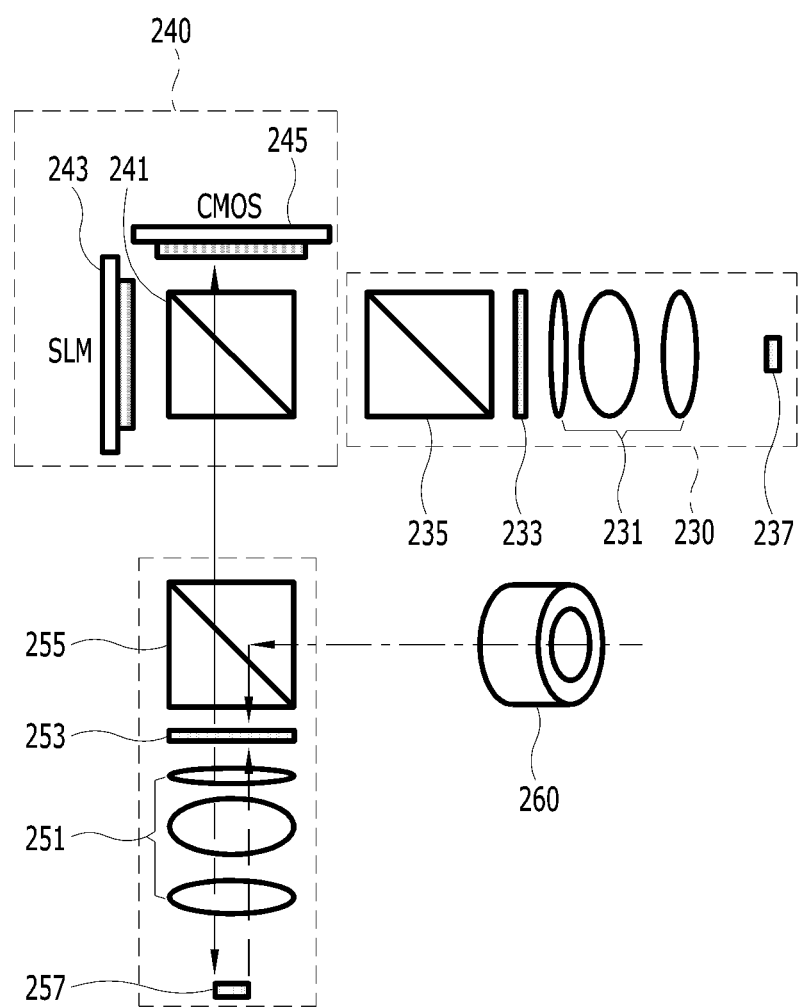

FIGS. 12 and 13 illustrate the first lens module 230, the combination unit, the second lens module 250, the half wave plate 248, and the objective lens 260 of the present invention.

When a signal beam output from the spatial light modulator 243 is S-polarized light, the spatial light modulator 243 and the second lens module 250 are oriented perpendicular to each other on the basis of the second polarizing beam splitter 241, and the signal beam output from the spatial light modulator 243 is reflected by the second polarizing beam splitter 241 to thereby be input to the second lens module 250.

Because the light input to the second lens module 250 needs to be transmitted to the relay lens 251 by passing through the third polarizing beam splitter 255, it is necessary to convert the signal beam output from the spatial light modulator 243 into P-polarized light. For the conversion of the signal beam into the P-polarized light, the half wave plate 248, which shifts a phase by $\lambda/2$, is interposed between the second lens module 250 and the combination module 240.

The converted P-polarized light passes through the quarter wave plate 253 and the relay lens 251 and then reaches the second mirror 257. The light reflected by the second mirror 257 again passes through the relay lens 251 and the quarter wave plate 253 in sequence, and thereafter reaches the third polarizing beam splitter 255. The input signal beam, which has been converted into the P-polarized light by the half wave plate 248, is again converted into S-polarized light by passing through the quarter wave plate 253 two times, thereby being reflected by the third polarizing beam splitter 255 so as to be supplied to the objective lens 260.

On the contrary, a reconstructed beam, input through the objective lens 260, needs to be S-polarized light in the same manner as the signal beam to be output through the objective lens 260, in order to ensure that it is bent in the third polarizing beam splitter 255 of the second lens module 250 so as to be input to the relay lens 251. The light having passed through the second lens module 250 has been converted into P-polarized light by passing through the quarter wave plate 253 two times. At this time, the reconstructed beam is converted into S-polarized light when passing through the half wave plate 248, and therefore cannot be transmitted to the image sensor 245, which is arranged parallel to the second lens module 250. Thus, the half wave plate 248 is removed when it is desired to output an image stored in the holographic storage medium 290.

As described above, the half wave plate 248 is inserted when storing holographic data, and is omitted when reading holographic data. In this way, the holographic storage system 200, to which the second lens module 250, which includes the single relay lens 251, the third polarizing beam splitter 255, and the quarter wave plate 253, is applied, may be provided.

Figure 14:
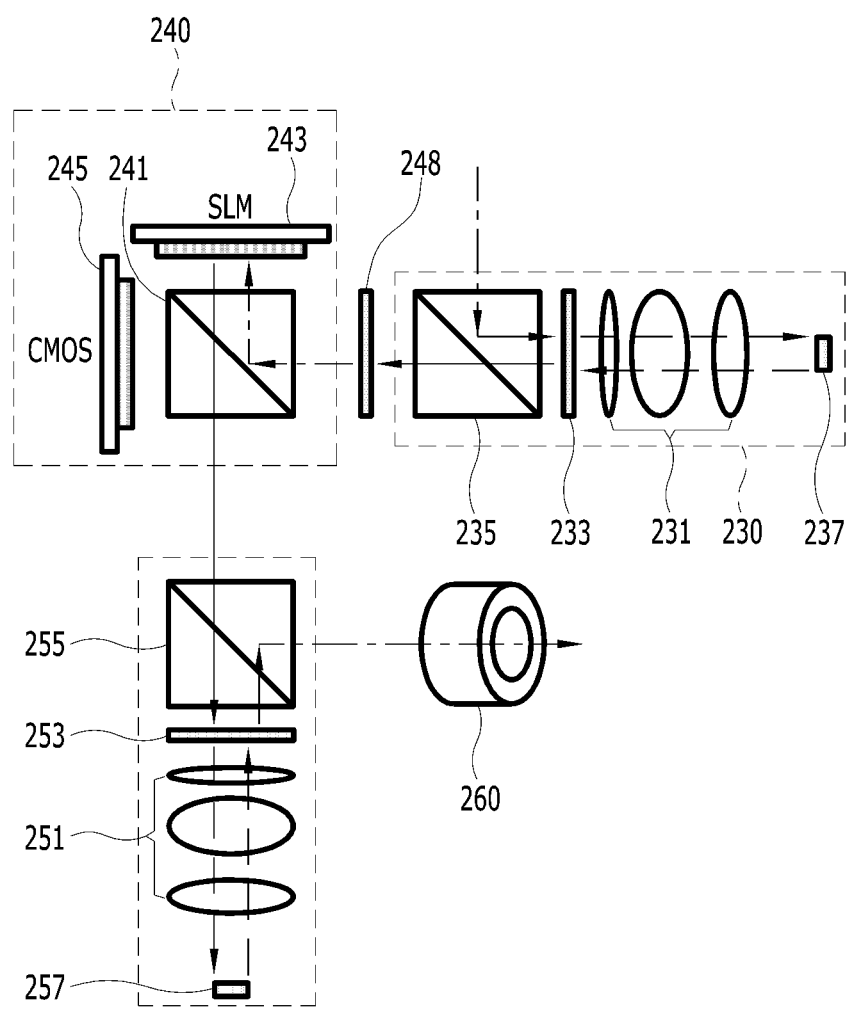
FIGS. 14 and 15 are views illustrating the process of recording and reading data on a holographic storage medium when positions of a spatial light modulator and an image sensor are exchanged compared to FIG. 12.

Meanwhile, as illustrated in FIG. 14, in an embodiment in which the spatial light modulator 243 is oriented perpendicular to the first lens module 230 and is located in a straight line in the second lens module 250, light input from the first lens module 230 needs to be S-polarized light in order to ensure that the light supplied from the light source unit 210 is input to the spatial light modulator 243. Accordingly, as illustrated in FIG. 14, the half wave plate 248 may be interposed between the first lens module 230 and the second lens module 250.

P-polarized light, emitted from the first lens module 230, is converted into S-polarized light by the half wave plate 248 to thereby be input to the spatial light modulator 243. Then, a signal beam, which is combined with digital information in the spatial light modulator 243, is converted into P-polarized light. The signal beam of P-polarized light, which has passed through the second polarizing beam splitter 241 and the third polarizing beam splitter 255, reaches the quarter wave plate 253 of the second lens module 250. The signal beam, which has been converted into S-polarized light after passing through the quarter wave plate 253 and the relay lens 251 two times, is reflected by the third polarizing beam splitter 255, thereby being directed to the holographic storage medium 290 through the objective lens 260.

Figure 15:
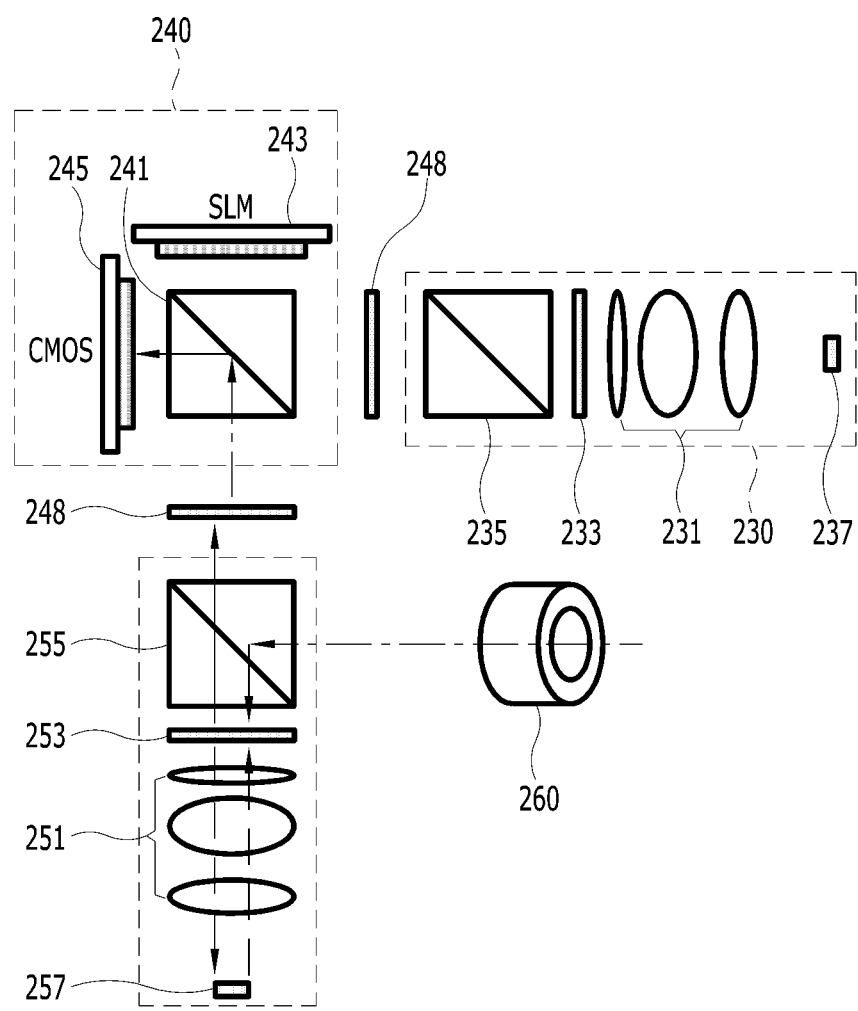

On the contrary to this, as illustrated in FIG. 15, when a reconstructed beam, which includes digital information stored in the holographic storage medium 290, is input to the objective lens 260, the reconstructed beam of S-polarized light is input in order to be supplied to the combination module 240 through the second lens module 250. The reconstructed beam is reflected by the third polarizing beam splitter 255, and is converted into P-polarized light by passing through the quarter wave plate 253 and the relay lens 251 two times. When the P-polarized light is input to the second polarizing beam splitter 241, the reconstructed beam is input to the spatial light modulator 243, rather than the image sensor 245. Thus, in order to convert the reconstructed beam into S-polarized light by shifting the phase of the reconstructed beam by $\lambda/2$, the half wave plate 248 is interposed between the second polarizing beam splitter 241 and the second lens module 250.

That is, in the present embodiment, the half wave plate 248 may be interposed between the second lens module 250 and the combination unit only when reading, and may be omitted when recording.

The half wave plate 248 may be physically interposed or removed. The half wave plate 248 may be implemented using a material that selectively exhibits anisotropy according to whether or not current is applied.

According to at least one embodiment of the present invention, it is possible to reduce the size of the holographic data storage system 200 by reducing the volume of the relay lens 251, and it is possible to lower manufacturing costs by reducing the number of lenses.

The above detailed description should not be construed as limitations in all terms and be considered by way of example. The scope of the present invention should be determined by the rational interpretation of the accompanying claims, and all changes are included in the scope of the present invention within the equivalent range of the present invention.

The invention claimed is:

1. A holographic data storage system comprising:
   a light source unit configured to supply light vibrating in a given direction;
   a reference lens configured to direct the light supplied from the light source unit to a holographic storage medium;
   a spatial light modulator (SLM) configured to combine digital information with the light supplied from the light source unit so as to modulate the light into a signal beam having a phase shift of half wave ($\lambda/2$) in relation to the light supplied from the light source unit;
   a second polarizing beam splitter (PBS) located in front of the spatial light modulator and configured to pass P-polarized light and reflect S-polarized light;
   a complementary metal oxide semiconductor (CMOS) image sensor oriented perpendicular to the spatial light modulator and configured to convert input light into an electrical signal;
   an objective lens configured to record the digital information on the holographic storage medium by directing the modulated signal beam to the holographic storage medium at a prescribed angle in relation to the reference lens;
   a first lens module configured to transmit light input from the light source unit to the spatial light modulator;
   a second lens module oriented perpendicular to the first lens module about the second polarizing beam splitter and configured to transmit the signal beam to the objective lens; and
   a half wave plate selectively located between the second polarizing beam splitter and the second lens module and configured to shift a phase of input light by half wave ($\lambda/2$),
   wherein at least one of the first lens module or the second lens module includes:
   a first polarizing beam splitter (PBS) configured to pass P-polarized light and reflect S-polarized light;
   a relay lens configured to collect the light having passed through the first polarizing beam splitter;
   a mirror configured to reflect the light collected while passing through the relay lens so as to return the light back to the relay lens; and
   a quarter wave plate located between the second polarizing beam splitter and the relay lens and configured to convert linearly polarized light passing therethrough into circularly polarized light and to convert circularly polarized light passing therethrough into linearly polarized light, and
   wherein a reconstructed beam, which is generated by emitting light from the reference lens to the holographic storage medium, is input to the CMOS image sensor through the objective lens, the second lens module, and the second polarizing beam splitter.

2. The holographic data storage system according to claim 1, wherein the mirror is located at a focal distance of the relay lens.

3. The holographic data storage system according to claim 1, wherein the mirror has a diameter within a range from 100 µm to 100 mm.

4. The holographic data storage system according to claim 1, wherein the spatial light modulator is oriented opposite to the first lens module about the second polarizing beam splitter when P-polarized light is supplied from the first lens module, and wherein the spatial light modulator is oriented perpendicular to the first lens module about the second polarizing beam splitter when S-polarized light is supplied from the first lens module.

5. The holographic data storage system according to claim 1, wherein the half wave plate is selectively located between the second polarizing beam splitter and the second lens module when the signal beam is emitted from the objective lens or when the reconstructed beam is input to the objective lens.

* * * * *